B. LIEBOWITZ AND J. BALSAM.
AUTOMOBILE LOCK.
APPLICATION FILED NOV. 12, 1921.

1,429,599.

Patented Sept. 19, 1922.

INVENTORS.
Benjamin Liebowitz & James Balsam
BY
ATTORNEY.

Patented Sept. 19, 1922.

1,429,599

UNITED STATES PATENT OFFICE.

BENJAMIN LIEBOWITZ, OF NEW ROCHELLE, AND JAMES BALSAM, OF NEW YORK, N. Y.;
SAID LIEBOWITZ ASSIGNOR TO SAID BALSAM.

AUTOMOBILE LOCK.

Application filed November 12, 1921. Serial No. 514,527.

*To all whom it may concern:*

Be it known that we, BENJAMIN LIEBOWITZ and JAMES BALSAM, citizens of the United States, respectively residing in the city of New Rochelle, county of Westchester, State of New York, and in the city of New York, county of New York, State of New York, have invented certain new and useful Improvements in Automobile Locks, of which the following is a specification.

This invention relates to locks for automobiles and particularly to a locking device for the steering wheel. The objects of the invention are to produce a simple, effective and inexpensive device of this character, which can be readily attached to an automobile, which will have the attaching means covered when the device is in the locked position so as to prevent tampering with same, which will have said attaching means uncovered when the device is in the unlocked position so as to permit removal if desired, and to achieve other objects not specifically mentioned.

An embodiment of the invention is illustrated in the accompanying drawings in which.

Figure 1:
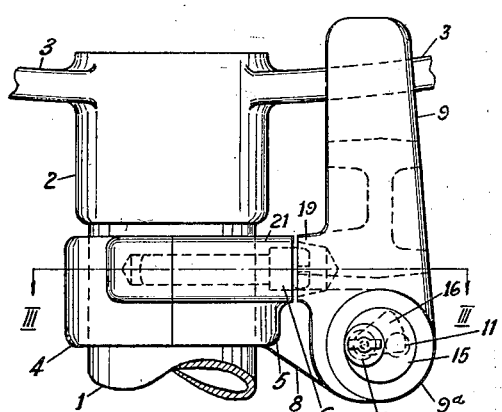
Fig. 1 is a side elevation showing the device in locked position with the attaching means covered.

Referring to the drawings, 1 is the steering column of an automobile, 2 is the hub of the steering wheel, and 3 indicates the spokes thereof. 4 and 5 are the two parts of a split clamp, which comprise the stationary member and which are fastened together by the bolts 6, thereby tightly clamping 4—5 to the steering post 1. In addition, the set-screw 7 is provided, to prevent shifting of the stationary member 4—5 on the steering-post 1.

The part 5 of the stationary member is provided with a lug 8, on which the fork 9 is hinged by means of the pivot pin 10, the fork 9 being provided for this purpose with hubs $9^a$ and $9^b$, which, together with 9, constitute the movable member. The lug 8 and hubs $9^a$ and $9^b$ are drilled to receive the pivot pin 10, as shown. These parts are also drilled to receive the bolt, which is split up into the three parts, 11, 12, 13, and backed by the spring 14.

The hub $9^a$ is bored to receive the cylinder lock, which may be of conventional or approved construction. The tumbler-barrel shaft of the cylinder is provided with a face cam 16 which is adapted to move the bolt-members endwise.

Figure 2:
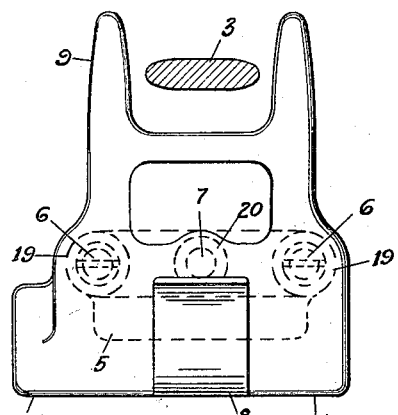
Fig. 2 is a front elevation thereof.
Figure 3:
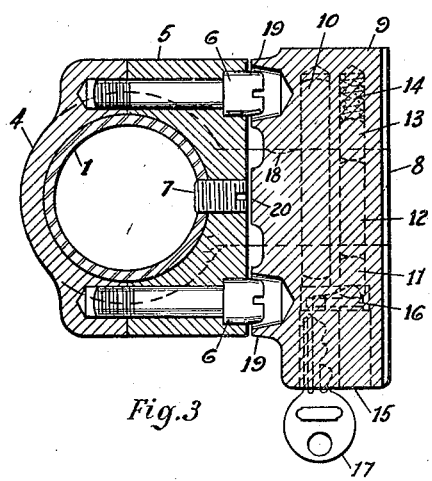
Fig. 3 is a section on line III—III of Fig. 1.

When the device is in the locked position shown in Figs. 1, 2, and 3, the holes in the hubs $9^a$ and $9^b$ which receive the bolt-members 11 and 13 line up with the hole in lug 8 which receives bolt member 12. The spring 14 therefore pushes out the bolts until bolt-member 11 is stopped by cam 16. Their planes of separation therefore no longer correspond to the planes of separation of lug 8 and hubs $9^a$ and $9^b$, so that rotation of fork 9 on its pivot-pin 10 is effectively prevented. The fork 9 cannot therefore be removed from its position embracing the spoke 3 of the steering wheel, which is thereby rendered inoperative.

Upon insertion of the proper key 17 into the tumbler-barrel of the cylinder 15, said tumbler can be rotated, thereby rotating the cam 16 with it. This shifts the bolt-members 11—12—13 endwise until their planes of separation substantially coincide with the planes of separation of the lug 8 and the hubs $9^a$ and $9^b$. This permits the fork 9 to be rotated about its pivot-pin 10 into the unlocked position shown in Fig. 4, releasing the spoke of the steering-wheel and permitting it freedom of operation. When the fork is thus rotated, it carries with it the bolt-members 11 and 13, while the bolt-member 12 remains stationary in the lug 8. This is clearly shown in Fig. 5, where it is also shown that the bolt-member 13, in this position, is pushed by the spring into a notch 18 in lug 8, so as to prevent the fork 9 from swinging or rattling. This notch is so shaped, however, that a moderate pressure on the fork 9 will release the bolt-member 13.

Figure 4:
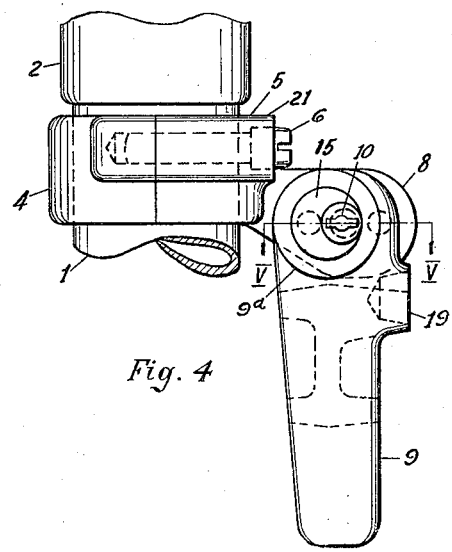
Fig. 4 is a side elevation showing device in unlocked position, with the attaching means uncovered, and, Fig. 5 is a section on line V—V of Fig. 4.
Figure 5:
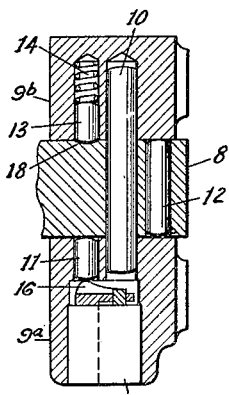

It will be observed that when the fork is in the unlocked position of Fig. 4, the heads of the bolts 6 and set-screw 7 are exposed. This permits simple attaching of the device to the steering post, and also its removal, if desired. When, however, the fork is in the locked position shown in Figs. 1, 2, 3, these bolts are covered by bosses 19—20 on the fork 9, as shown, thus effectively preventing tampering. The covering means may be formed in a variety of ways. We prefer to have the heads of the bolts 6 project somewhat, and to provide recesses in the bosses 19 to receive these heads, the object being to prevent forcing of the lock by insertion of a chisel in the narrow space between boss 19 and the boss 21 on clamp-member 5.

It will be understood that the cylinder 15 is pinned in the hub in any convenient and effective manner. The pivot pin 10 may also be pinned, but in our construction, this is not necessary.

Our invention is not to be construed as limited to the specific embodiment shown.

We claim:

1. In a locking device for an automobile steering wheel, a split collar adapted to surround the steering column adjacent the steering wheel, clamping means for the collar accessible from one side thereof, a spoke-engaging member pivotally attached to the collar and adapted when swung into upright position both to engage a spoke of the steering wheel and to cover the clamping means, the joint between the collar and the spoke-engaging member having longitudinal openings that aline when the latter is in upright position, a spring pressed split bolt mounted for endwise movement in said openings and automatically operative to lock the parts when the spoke-engaging member is swung into its upright position, and key-controlled means in said member for moving the split-bolt into unlocking position.

2. In a locking device for an automobile steering wheel, a split collar adapted to surround the steering column adjacent the steering wheel, clamping bolts carried in the collar and having protruding heads, a spoke-engaging member pivotally attached to the collar adapted when swung into upright position to engage a spoke of the steering wheel and having recesses that receive and cover the protruding heads of the clamping bolts in said position, the joint between the collar and the spoke-engaging member having longitudinal openings that aline when the latter is in upright position, a spring pressed split-bolt mounted for endwise movement in said openings and automatically operative to lock the parts when the spoke-engaging member is swung into its upright position, and key-controlled means in said member for moving the split-bolt into unlocking position.

3. In a locking device for an automobile steering wheel, a split collar adapted to surround the steering column adjacent the steering wheel, clamping means carried in the collar and accessible from one side thereof, a spoke-engaging member pivotally jointed to the collar and adapted in upright position both to engage a spoke of the steering wheel and to cover the clamping means, locking means extending longitudinally of the joint between the collar and spoke-engaging member and automatically operative to lock the latter when swung into upright position, and key-controlled means carried in the spoke-engaging member for unlocking the locking means.

4. In a locking device for an automobile steering wheel, a split collar adapted to surround the steering column adjacent the steering wheel and having an outwardly projecting lug, clamping means for the collar accessible from the side thereof bearing the lug, a forked member pivotally attached to the lug and adapted in upright position both to engage a spoke of the steering wheel and to cover the clamping means, locking means automatically operative to lock the forked member when swung into upright position, and key-controlled means for unlocking said locking means.

5. In a locking device for an automobile steering wheel, a split collar clamped to the steering column, a forked member pivotally jointed to the collar and adapted when swung into upright position to engage a spoke of the steering wheel, a spring pressed split bolt extending longitudinally of the joint between the collar and the forked member and automatically operative to lock the latter in upright position, and key-controlled means for unlocking the same.

BENJAMIN LIEBOWITZ.
JAMES BALSAM.